United States Patent Office 2,713,588
Patented July 19, 1955

2,713,588

3β,11α-DIHYDROXYALLOPREGNANE-20-ONE AND ESTERS THEREOF

Alan H. Nathan, John A. Hogg, and Douglas A. Lyttle, Kalamazoo, Mich., assignors to The Upjohn Company, Kalamazoo, Mich., a corporation of Michigan No Drawing. Application April 1, 1952, Serial No. 279,944

4 Claims. (Cl. 260—397.45)

The present invention relates to a new steroid compound and more particularly to 3β,11α-dihydroxyallopregnane-20-one.

It is an object of the present invention to provide the novel 3β,11α-dihydroxyallopregnane-20-one.

The novel compound of the present invention has utility as an intermediate in the preparation of biologically active compounds such as cortisone, and is also physiologically active per se. Chromic acid oxidation of the thermal stable 3β,11α-dihydroxyallopregnane-20-one produces the known allopregnane-3,11,20-trione. 3β,11α-dihydroxyallopregnane-20-one demonstrates anaesthetic and inhibitory properties in hypertensive, estrogenic, testoid, folliculoid and progesterone activities.

In the process for the production of the compound of the present invention, 11α-hydroxyprogesterone, prepared from progesterone by a fermentation process as more fully described in Preparation 1, is hydrogenated in the presence of a hydrogenation catalyst and the reduction products are separated to yield the normal and allo forms of 11α-hydroxypregnane-3,20-dione. The 11α-hydroxyallopregnane-3,20-dione is then treated with sodium borohydride to produce 3β,11α-dihydroxyallopregnane-20-one.

The following preparations and examples are illustrative of the objects, processes and products of the present invention, but are not to be construed as limiting.

PREPARATION 1.—11α-HYDROXYPROGESTERONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Twelve liters of this sterilized medium was inoculated with Rhizopus nigricans minus strain, American Type Culture Collection No. 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem. 36, 504 (1944). To this medium containing a 24 hour growth of Rhizopus nigricans was added six grams of progesterone in 25 milliliters of acetone to provide a suspension of the steroid in the culture. After an additional 24 hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous $Na_2SO_4$ per liter of solvent and filtering, the solvent was removed by distillation. The residue was dissolved in a minimum of methylene chloride, filtered and the solvent was then evaporated. The resulting crude crystals were dried and then washed four or five times with five milliliter portions of ether per gram of crude crystals, yielding 5.072 grams of crystals melting at 165 to 168 degrees centigrade. Recrystallization of 400 milligrams of these crystals from methanol gave 311 milligrams of 11α-hydroxyprogesterone, melting at 166 to 168 degrees centigrade, $[\alpha]_D^{24}$ of plus 180 degrees (1.0127 in chloroform), $k_{242}$ of 46.72.

Analysis.—Calculated for $C_{21}H_{30}O_3$: C, 76.40; H, 9.10. Found: C, 76.77; H, 8.92.

PREPARATION 2.—11α-HYDROXYPREGNANE-3,20-DIONE AND 11α-HYDROXYALLOPREGNANE-3,20-DIONE

A solution of 250 milligrams (0.75 millimole) of 11α-hydroxyprogesterone in 100 milliliters of ethanol containing six drops of triethylamine was subjected to hydrogenation at room temperature under a pressure of about ten pounds of hydrogen in the presence of 45 milligrams of a thirty percent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145 to 185 degrees centigrade. This product was extracted with a mixture of one milliliter of ether and nine milliliters of Skellysolve B petroleum ether, boiling range 60 to 70 degrees centigrade. On standing, the extract deposited eighty milligrams (32 percent) of 11α-hydroxypregnane-3,20-dione as feathery needles which melted at about 85 to 90 degrees centigrade. The melting point of the normal form was extremely variable, ranging from about 55 degrees centigrade to about 130 degrees centigrade. The variability in melting point did not affect the utility of the various batches as the same results were obtained when these batches were employed in further operations.

Analysis.—Calculated for $C_{21}H_{32}O_3$: C, 75.86; H, 9.70. Found: C, 76.13; H, 9.63.

The residue from the above extraction weighed 146 milligrams and melted at 165 to 185 degrees centigrade. Recrystallization from ethyl acetate gave 85 milligrams (34 percent) of 11α-hydroxyallopregnane-3,20-dione, melting at 193 to 196 degrees centigrade with softening about 190 degrees. A purified sample melted at 198.5 to 199.5 degrees centigrade.

Analysis.—Calculated for $C_{21}H_{32}O_3$: C, 75.86; H, 9.70. Found: C, 75.59; H, 9.98.

The separation of the normal and allo pregnanes was also accomplished by chromatography. An intimate mixture of 16.7 grams of diatomaceous earth (Celite 545) and 8.3 grams of activated carbon (Darco G-60) was wet packed with about 150 milliliters of methanol into a column three centimeters wide. About two pounds of air pressure was applied until the liquid had dropped to the level of the adsorbent. A plug of cotton was packed on the top of the adsorbent and the column was washed with one 200-milliliter fraction of methanol and two 200-milliliter fractions of acetone. The reaction residue from a hydrogenation in methanol (according to the procedure given above) of 500 milligrams of 11α-hydroxyprogesterone was dissolved in 200 milliliters of acetone and added to the column. This fraction, after passing through the column, was termed the first eluate fraction. It was followed by eight 200-milliliter fractions of acetone and four 200-milliliter fractions of methylene chloride. Each new fraction was added when the level of the preceding one reached the cotton plug. Fractions two to six, inclusive, were combined and the solvent was removed by evaporation to yield 323 milligrams of 11α-hydroxypregnane-2,20-dione. 11α-hydroxyallopregnane-3,20-dione, 123 milligrams, was similarly obtained from fractions ten to twelve, inclusive.

*Example 1.—3β,11α-dihydroxyallopregnane-20-one*

To a solution of 250 milligrams (0.753 millimole) of 11α-hydroxyallopregnane-3,20-dione (Preparation 2) in fifteen milliliters of absolute ethanol was added at room temperature a suspension of 8.8 milligrams (0.194 millimole based on pure reagent) of sodium borohydride (assay 83.6 percent) in 2.5 milliliters of ethanol. After standing for fifteen minutes, the mixture was warmed on a steam bath for fifteen minutes, five milliliters of water and one drop of acetic acid were added and the mixture was evaporated to dryness on a steam bath. The residue was crystallized from benzene to yield 164 milligrams (65 percent) of 3β,11α-dihydroxyallopregnane-20-one which melted at 169 to 173 degrees centigrade with softening at 165 degrees. Recrystallization from two milliliters of ethyl acetate and 0.2 milliliter of methylcyclohexane gave small transparent prisms of 3β-11α-dihydroxyallopregnane-20-one melting at 174 to 176 degrees centigrade; $[\alpha]_D^{23}$ of plus 73 degrees (1.5037 in ethanol).

*Example 2.—3β,11α-diacetoxyallopregnane-20-one*

To a cold solution of 50 milligrams of 3β,11α-dihydroxyallopregnane-20-one dissolved in two milliliters of pyridine (freshly distilled over barium hydroxide) was added five milliliters of acetic anhydride. The reaction mixture was maintained at room temperature for fifteen hours, then diluted with fifty milliliters of ice water, and extracted with ether. The ether extract was washed with ten percent hydrochloric acid, ten percent sodium bicarbonate solution, and water, dried over anhydrous sodium sulfate and filtered. Evaporation of the filtered ether extract produced 3β,11α-diacetoxyallopregnane-20-one which was purified by two recrystallizations from acetone by the addition of Skellysolve B petroleum ether to cause precipitation.

The mono- and di-esters of 3β,11α-dihydroxyallopregnane-20-one may be prepared according to recognized acylation procedures illustrated by Example 2 or by reacting 3β,11α-dihydroxyallopregnane-20-one with ketene, ketenes of selected acids, selected acids, acid anhydrides or acid chlorides in an organic solvent, illustratively pyridine. Representative esters thus-preparable include carboxylic acyloxy esters of saturated or unsaturated, aliphatic, carbocyclic, cyclo-aliphatic, aryl, arylalkyl, alkaryl, mono, di or polycarboxylic acids which form ester groups such as, for example, formoyloxy, acetoxy, propionyloxy, butyryloxy, valeryloxy, hexanoyloxy, heptanoyloxy, octanoyloxy, benzoxy, phenylacetoxy, toluoyloxy, naphthoyloxy, cyclopentylformoyloxy, β-cyclopentylpropionloxy, acryloyloxy, cyclohexylformyloxy, the half and di-esters of malonic, maleic, succinic, glutaric and adipic acids, and the like. The acids may also contain non-interfering substituents, such as mono or poly halo, chloro, bromo, hydroxy, methoxy, and the like, if desired.

If a mixed ester involving two different acyl groups is desired, the 3β,11α-dihydroxyallopregnane-20-one may be partially esterified by reaction in equal molar proportions with one acylating agent and the resulting mono-ester may then be completely esterified with another acylating agent which introduces a different acyl group. Thus 3β-acetoxy, 11α-propionyloxyallopregnane-20-one or other mixed esters of the herein mentioned acid groups may be prepared.

This application is a continuation-in-part of application Serial No. 244,744, filed August 31, 1951, now Pat. No. 2,647,134.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. 3β,11α-dihydroxyallopregnane-20-one.
2. An allopregnane represented by the structural formula:

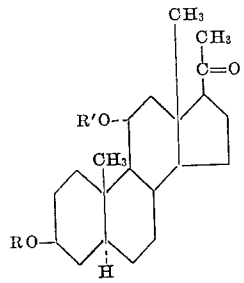

wherein R and R' are selected from the radicals hydrogen and hydrocarbon-carboxylic acyl containing less than nine carbon atoms.

3. An allopregnane ester represented by the structural formula:

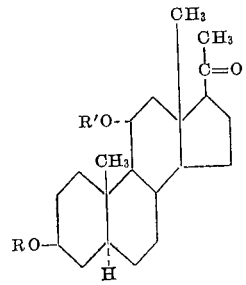

wherein R and R' are hydrocarbon-carboxylic acyl radicals containing less than nine carbon atoms.

4. 3β,11α-diacetoxyallopregnane-20-one.

References Cited in the file of this patent

FOREIGN PATENTS 594,878    Great Britain _____ Nov. 21, 1947